(12) United States Patent
Gabrielov et al.

(10) Patent No.: US 9,156,029 B2
(45) Date of Patent: Oct. 13, 2015

(54) COMPOSITION HAVING AN ACTIVE METAL OR PRECURSOR, AN AMINE COMPONENT AND A NON-AMINE CONTAINING POLAR ADDITIVE USEFUL IN THE CATALYTIC HYDROPROCESSING OF HYDROCARBONS, A METHOD OF MAKING SUCH CATALYST, AND A PROCESS OF USING SUCH CATALYST

(75) Inventors: Alexei Grigorievich Gabrielov, Houston, TX (US); William Douglas Gillespie, Katy, TX (US)

(73) Assignee: Shell Oil Company, Houston, TX (US)

( * ) Notice: Subject to any disclaimer, the term of this patent is extended or adjusted under 35 U.S.C. 154(b) by 571 days.

(21) Appl. No.: 13/533,677

(22) Filed: Jun. 26, 2012

(65) Prior Publication Data

US 2013/0165317 A1   Jun. 27, 2013

Related U.S. Application Data

(60) Provisional application No. 61/501,871, filed on Jun. 28, 2011.

(51) Int. Cl.
| | | |
|---|---|---|
| *B01J 21/00* | (2006.01) | |
| *B01J 23/00* | (2006.01) | |
| *B01J 25/00* | (2006.01) | |
| *B01J 29/00* | (2006.01) | |
| *B01J 31/00* | (2006.01) | |
| *B01J 31/28* | (2006.01) | |
| *B01J 23/85* | (2006.01) | |
| *B01J 27/19* | (2006.01) | |
| *B01J 31/02* | (2006.01) | |
| *B01J 37/02* | (2006.01) | |
| *B01J 37/18* | (2006.01) | |
| *C10G 45/04* | (2006.01) | |
| *B01J 23/883* | (2006.01) | |
| *B01J 27/24* | (2006.01) | |
| *C10G 45/06* | (2006.01) | |
| *B01J 37/20* | (2006.01) | |
| *B01J 37/03* | (2006.01) | |
| *B01J 35/10* | (2006.01) | |
| *B01J 37/00* | (2006.01) | |

(52) U.S. Cl.
CPC *B01J 31/28* (2013.01); *B01J 23/85* (2013.01); *B01J 23/883* (2013.01); *B01J 27/19* (2013.01); *B01J 27/24* (2013.01); *B01J 31/0204* (2013.01); *B01J 31/0238* (2013.01); *B01J 31/0247* (2013.01); *B01J 31/0254* (2013.01); *B01J 31/0271* (2013.01); *B01J 35/1038* (2013.01); *B01J 37/0201* (2013.01); *B01J 37/0203* (2013.01); *B01J 37/024* (2013.01); *B01J 37/0213* (2013.01); *B01J 37/18* (2013.01); *C10G 45/04* (2013.01); *C10G 45/06* (2013.01); *B01J 35/1014* (2013.01); *B01J 35/1019* (2013.01); *B01J 35/1042* (2013.01); *B01J 35/1047* (2013.01); *B01J 37/0009* (2013.01); *B01J 37/0036* (2013.01); *B01J 37/031* (2013.01); *B01J 37/20* (2013.01); *C10G 2300/70* (2013.01)

(58) Field of Classification Search
USPC .......................................... 502/167, 100, 150
See application file for complete search history.

(56) References Cited

U.S. PATENT DOCUMENTS

| | | | | |
|---|---|---|---|---|
| 4,102,820 | A * | 7/1978 | Cavitt | 502/348 |
| 4,981,828 | A * | 1/1991 | Takahashi et al. | 502/168 |
| 5,086,026 | A * | 2/1992 | Chattha et al. | 502/159 |
| 6,329,314 | B1 | 12/2001 | Mignard et al. | 502/222 |
| 6,540,908 | B1 | 4/2003 | Eijsbouts et al. | 208/216 R |
| 7,235,173 | B2 | 6/2007 | Diehl et al. | 208/216 R |
| 8,262,905 | B2 | 9/2012 | Gabrielov et al. | |
| 2004/0055936 | A1 * | 3/2004 | Diehl et al. | 208/216 R |
| 2009/0038993 | A1 | 2/2009 | Gabrielov et al. | 208/243 |
| 2010/0236988 | A1 * | 9/2010 | Gabrielov et al. | 208/217 |

OTHER PUBLICATIONS

PCT, International Search Report, Oct. 19, 2012, TH4243-PCT, Application No. PCT/US2012/044155.

* cited by examiner

*Primary Examiner* — James McDonough
(74) *Attorney, Agent, or Firm* — Charles W. Stewart

(57) ABSTRACT

A composition that comprises a support material that is loaded with an active metal or metal precursor, an amine component, and a non-amine containing polar additive. The composition is useful in the hydroprocessing of hydrocarbon feedstocks. The composition is prepared by incorporating a metal solution into a support material followed by incorporating therein an amine component and a non-amine containing polar additive.

14 Claims, No Drawings

COMPOSITION HAVING AN ACTIVE METAL OR PRECURSOR, AN AMINE COMPONENT AND A NON-AMINE CONTAINING POLAR ADDITIVE USEFUL IN THE CATALYTIC HYDROPROCESSING OF HYDROCARBONS, A METHOD OF MAKING SUCH CATALYST, AND A PROCESS OF USING SUCH CATALYST

This application claims the benefit of U.S. Provisional Application No. 61/501,871 filed Jun. 28, 2011, the entire disclosure of which is hereby incorporated by reference.

This invention relates to a composition that is impregnated an amine component and a non-amine containing polar additive and which composition is useful in the catalytic hydroprocessing of hydrocarbons, a method of making such a composition, and its use in the catalytic hydroprocessing of hydrocarbon feedstocks.

Hydroprocessing catalysts are used in the removal of organic sulfur and nitrogen compounds from hydrocarbon feedstocks that are typically derived from the distillation of crude petroleum. The organic sulfur and nitrogen compounds are catalytically converted in the presence of hydrogen respectively to hydrogen sulfide and ammonia to then subsequently be removed from the hydrotreated feedstock. Generally, such hydroprocessing catalysts include a carrier having deposited thereon a Group VIB metal, such as molybdenum and tungsten, and a Group VIII metal, such as nickel and cobalt. Phosphorus may also be present in the hydroprocessing catalyst. One method of preparing a hydroprocessing catalyst includes the impregnation of a carrier with the hydrogenation metal components followed by calcination of the impregnated carrier to convert the metal components into oxides. The calcined catalyst is then subjected to a sulfidation treatment to convert the metal oxides to metal sulfide.

U.S. Pat. No. 6,329,314 discloses a process for the activation of a hydroconversion catalyst that contains a Group VIII metal component and, optionally, a Group VI metal component by impregnating the catalyst with a liquid phase petroleum fraction, a thionic compound and a nitrogenous compound under certain specified conditions.

U.S. Pat. No. 6,540,908 discloses a process for preparing a sulfided hydrotreating catalyst. This process involves combining a catalyst carrier of alumina and a hydrogenation metal catalyst carrier with an organic compound that includes a covalently bonded nitrogen atom and a carbonyl moiety followed by sulfiding the resulting combination.

U.S. Pat. No. 7,235,173 discloses a hydrotreating catalyst that contains at least one group VIB and/or group VIII metal and, optionally, phosphorus and/or silicon with an organic compound additive. It is essential that the organic additive have at least one nitrogen atom. Examples of compounds that correspond to the generic general formula representative of possible organic additives of the hydrotreating catalyst include those selected from the group consisting of hexamethylene diamine, monoethanolamine, diethanolamine, triethanolamine, N,N-dimethyl-N'-ethylethylene diamine, amino alcohol and amino alkoxysilane. The organic additive can be introduced onto the hydrotreatment catalyst by dry impregnation, or by co-impregnation simultaneously with the metals, or by deposition during sulfurization of the catalyst.

US 2009/0038993 discloses a hydrocarbon oil-impregnated composition that comprises a support material having incorporated therein a metal component and impregnated with a hydrocarbon oil. The hydrocarbon oil-impregnated composition is useful in hydrotreating of hydrocarbon feedstocks. In the preparation of the hydrocarbon oil-impregnated composition a support material that is loaded with a metal precursor is uncalcined and non-sulfided when it is impregnated with the hydrocarbon oil. The hydrocarbon oil-impregnated composition exhibits better hydrodesulfurization catalytic activity than does certain non-oil impregnated compositions and it exhibits good catalytic stability.

US 2010/0236988 discloses a hydroprocessing catalyst composition that comprises a support material having incorporated therein a metal component and impregnated with both a hydrocarbon oil and a polar additive. The oil and polar additive impregnated composition is prepared by incorporating into a calcined support material that is loaded with an active metal precursor,but not subsequently calcined or sulfide, the hydrocarbon oil and polar additive. The oil and polar additive impregnated composition exhibits good hydrodesulfurization catalytic activity.

There is an ongoing need to find improved higher activity hydrotreating catalysts and, thus, it is one objective of this invention to provide a composition that is useful and highly active in the catalytic hydrotreating of hydrocarbon feedstocks and a method of preparing such a composition.

Accordingly, provided is a composition that comprises a support material that is loaded with an active metal precursor, an amine component, and a non-amine containing polar additive. The composition may be made by incorporating a metal-containing solution into a support material to provide a metal-incorporated support material; and incorporating both an amine component and a non-amine containing polar additive into said metal-incorporated support material to thereby provide an impregnated composition comprising a support material, an amine component, and a non-amine containing polar additive. The inventive composition may further be used by contacting a hydrocarbon feedstock under hydrotreating process conditions with the inventive composition.

Published U.S. patent application Pub. No. US 2010/0236988, which is hereby incorporated herein by reference, discloses an inventive composition that utilizes a polar additive, such as dimethylformamide (DMF), in combination with a hydrocarbon oil to provide a composition that is especially useful in applications involving the catalytic hydroprocessing of hydrocarbon feedstocks. While these inventive compositions have been found to have very beneficial properties, it has been discovered that in the combined use of such polar additives, other than those polar additives that contain an amino functional group, with certain amine compounds, as defined herein, there is a synergistic effect. Thus, the composition of the invention is one which is particularly useful in the catalytic hydroprocessing of petroleum derived or other hydrocarbon feedstocks, or the composition of the invention is one which is convertible by the treatment with hydrogen or a sulfur compound, or both, into a catalyst composition having particularly good catalytic properties in the hydroprocessing of hydrocarbon feedstocks.

As noted, it has been discovered that, by using an amine compound in combination with a non-amine containing polar additive with a support material or carrier that is loaded with a catalytically active metal compound or metal precursor, the activity of the composition when used in the hydrodesulfurization (HDS) or hydrodenitrogenation (HDN) of hydrocarbon feedstocks can be enhanced. It further has been discovered that the use of the amine compound in combination with the non-amine containing polar additive provides for an even greater enhancement in HDS or HDN catalytic activity than when the ether amine compound is used alone or the non-amine containing additive alone. The use of the amine compound as an additive of the inventive composition may also be desirable due to its reasonably high flash point which makes it easy to handle, store and use.

The composition of the invention includes a support material that has incorporated therein or is loaded with a metal component, which is or can be converted to a metal compound that has activity towards the catalytic hydrogenation of organic sulfur and nitrogen compounds, or, otherwise, the metal component is useful in the hydrodesulfurization (HDS) or hydrodenitrogenation (HDN) of hydrocarbon feedstocks. This support material which contains the metal component further has incorporated therein a suitable amine compound and a suitable non-amine containing polar additive to thereby provide an impregnated composition of the invention.

The support material of the inventive composition can comprise any suitable inorganic oxide material that is typically used to carry catalytically active metal components. Examples of possible useful inorganic oxide materials include alumina, silica, silica-alumina, magnesia, zirconia, boria, titania and mixtures of any two or more of such inorganic oxides. The preferred inorganic oxides for use in the formation of the support material are alumina, silica, silica-alumina and mixtures thereof. Most preferred, however, is alumina In the preparation of various embodiments of the inventive composition, the metal component of the composition may be incorporated into the support material by any suitable method or means that provides the support material that is loaded with an active metal precursor. Thus, the composition includes or comprises the support material and a metal component.

One method of incorporating the metal component into the support material, includes, for example, co-mulling the support material with the active metal or metal precursor to yield a co-mulled mixture of the two components. Or, another method includes the co-precipitation of the support material and metal component to form a co-precipitated mixture of the support material and metal component. Or, in a preferred method, the support material is impregnated with the metal component using any of the known impregnation methods, such as incipient wetness, to incorporate the metal component into the support material.

When using the impregnation method to incorporate the metal component into the support material, it is preferred for the support material to be formed into a shaped particle comprising an inorganic oxide material and thereafter loading the shaped particle with an active metal precursor, preferably, by the impregnation of the shaped particle with an aqueous solution of a metal salt to give the support material containing a metal of a metal salt solution.

To form the shaped particle, the inorganic oxide material, which preferably is in powder form, is mixed with water and, if desired or needed, a peptizing agent and/or a binder to form a mixture that can be shaped into an agglomerate. It is desirable for the mixture to be in the form of an extrudable paste suitable for extrusion into extrudate particles, which may be of various shapes such as cylinders, trilobes, etc. and nominal sizes such as $\frac{1}{16}$", $\frac{1}{8}$", $\frac{3}{16}$", etc. The support material of the inventive composition, thus, preferably, is a shaped particle comprising an inorganic oxide material.

The shaped particle is then dried under standard drying conditions that can include a drying temperature in the range of from 50° C. to 200° C., preferably, from 75° C. to 175° C., and, most preferably, from 90° C. to 150° C. After drying, the shaped particle is calcined under standard calcination conditions that can include a calcination temperature in the range of from 250° C. to 900° C., preferably, from 300° C. to 800° C., and, most preferably, from 350° C. to 600° C.

The calcined shaped particle can have a surface area (determined by the BET method employing $N_2$, ASTM test method D 3037) that is in the range of from 50 $m^2/g$ to 450 $m^2/g$, preferably from 75 $m^2/g$ to 400 $m^2/g$, and, most preferably, from 100 $m^2/g$ to 350 $m^2/g$. The mean pore diameter in angstroms (Å) of the calcined shaped particle is in the range of from 50 to 200, preferably, from 70 to 150, and, most preferably, from 75 to 125. The pore volume of the calcined shaped particle is in the range of from 0.5 cc/g to 1.1 cc/g, preferably, from 0.6 cc/g to 1.0 cc/g, and, most preferably, from 0.7 to 0.9 cc/g. Less than ten percent (10%) of the total pore volume of the calcined shaped particle is contained in the pores having a pore diameter greater than 350 Å, preferably, less than 7.5% of the total pore volume of the calcined shaped particle is contained in the pores having a pore diameter greater than 350 Å, and, most preferably, less than 5%.

The references herein to the pore size distribution and pore volume of the calcined shaped particle are to those properties as determined by mercury intrusion porosimetry, ASTM test method D 4284. The measurement of the pore size distribution of the calcined shaped particle is by any suitable measurement instrument using a contact angle of 140° with a mercury surface tension of 474 dyne/cm at 25° C.

In a preferred embodiment of the invention, the calcined shaped particle is impregnated with a metal component by use of one or more impregnation steps using one or more aqueous solutions containing at least one metal salt wherein the metal compound of the metal salt solution is an active metal or active metal precursor. The metal elements are those selected from Group 6 of the IUPAC Periodic Table of the elements (e.g., chromium (Cr), molybdenum (Mo), and tungsten (W)) and Groups 9 and 10 of the IUPAC Periodic Table of the Elements (e.g., cobalt (Co) and nickel (Ni)). Phosphorous (P) is also a desired metal component. For the Group 9 and 10 metals, the metal salts include Group 9 or 10 metal acetates, formats, citrates, oxides, hydroxides, carbonates, nitrates, sulfates, and two or more thereof. The preferred metal salts are metal nitrates, for example, such as nitrates of nickel or cobalt, or both. For the Group 6 metals, the metal salts include Group 6 metal oxides or sulfides. Preferred are salts containing the Group 6 metal and ammonium ion, such as ammonium heptamolybdate and ammonium dimolybdate.

The concentration of the metal compounds in the impregnation solution is selected so as to provide the desired metal content in the final composition of the invention taking into consideration the pore volume of the support material into which the aqueous solution is to be impregnated and the amount of additive that is to be later incorporated into the support material that is loaded with a metal component. Typically, the concentration of metal compound in the impregnation solution is in the range of from 0.01 to 100 moles per liter.

The metal content of the support material having a metal component incorporated therein may depend upon the application for which the additive impregnated composition of the invention is to be used, but, generally, for hydroprocessing applications, the Group 9 and 10 metal component, i.e., cobalt or nickel, preferably, nickel, can be present in the support material having a metal component incorporated therein in an amount in the range of from 0.5 wt. % to 20 wt. %, preferably from 1 wt. % to 15 wt. %, and, most preferably, from 2 wt. % to 12 wt. %. The Group 6 metal component, i.e., molybdenum or tungsten, preferably, molybdenum, can be present in the support material having a metal component incorporated therein in an amount in the range of from 5 wt. % to 50 wt. %, preferably from 8 wt. % to 40 wt. %, and, most preferably, from 12 wt. % to 30 wt. %. The above-referenced weight percents for the metal components are based on the dry support material and the metal component as the element regardless of the actual form of the metal component.

To provide the additive impregnated composition of the invention, a suitable amine compound and a suitable non-amine containing polar additive are incorporated into the support material that also has incorporated therein, as described above, the metal component or active metal precursor. The amine compound and non-amine containing polar additive are used to fill a significant portion of the available pore volume of the pores of the support material, which is already loaded with the active metal precursor, to thereby provide a composition that comprises a support material containing a metal component, an amine component and a non-amine containing polar additive.

The impregnated composition may be installed, as is, into a reactor vessel or within a reactor system that is to undergo a start-up procedure in preparation of or prior to the introduction of a sulfiding feed that can include a sulfiding agent or a hydrocarbon feedstock containing a concentration of an organic sulfur compound.

One embodiment of the invention includes a support material loaded with an active metal precursor that is not thereafter calcined or sulfided prior to its loading into a reactor vessel or system for its ultimate use as a hydrodesulfurization or hydrodenitrogenation catalyst. It can, however, be sulfided, in situ, in a delayed feed introduction start-up procedure. The delayed feed introduction start-up procedure is hereinafter more fully described.

In the preparation of the inventive composition, any suitable method or means may be used to impregnate the metal loaded support material with the amine component and the non-amine containing polar additive. The impregnation may be done by separately impregnating the metals loaded support material with the amine component alone and with the non-amine containing polar additive alone, or the impregnation may be done by coincidentally impregnating the metals loaded support material with a mixture of both the amine component and the non-amine containing polar additive or by simultaneously impregnating the metals loaded support material with the amine component and the non-amine containing polar additive.

It is preferred to impregnate the metal loaded support material with a mixture or blend of the the amine component and the non-amine containing polar additive. The amine component and the non-amine containing polar additive should be present in the mixture or blend thereof in the desired relative amounts. The preferred method of impregnation may be any standard well-known pore fill methodology whereby the pore volume is filled by taking advantage of capillary action to draw the liquid into the pores of the metal loaded support material. It is desirable to fill at least 75% of the pore volume of the metal loaded support material with the amine component and the non-amine containing polar additive. It is preferred for at least 80% of the pore volume of the metal loaded support material to be filled with the amine component and the non-amine containing polar additive, and, most preferred, at least 90% of the pore volume is filled with the amine component and the non-amine containing polar additive.

As noted above, it has been found that there is a synergistic effect in the catalytic performance of the inventive composition from using the amine component in combination with the non-amine containing polar additive. The use of the amine compound in combination with the non-amine containing polar additive in the metal loaded support material provides a greater catalytic benefit than with the use of either the amine compound alone or the non-amine containing polar additive alone. Also, the relative weight ratio of the non-amine containing polar additive to amine compound incorporated into the metal loaded support material can be important.

It can be desirable for the relative weight ratio of the non-amine containing polar additive to amine compound that are incorporated into the metal-incorporated support material to be in the range upwardly to 10:1 (10 weight parts non-amine containing polar additive to 1 weight part amine compound), for example, the weight ratio may be in the range of from 0:01 to 10:1. More typically, the weight ratio of the non-amine containing polar additive to amine compound should be in the range of from 0.1:1 to 9:1. Preferably, the weight ratio is in the range of from 0.2:1 to 8:1, more preferably, from 0.2:1 to 7:1, and, most preferably, it is in the range of from 0.25:1 to 6:1.

Any suitable amine compound may be used as a component of the inventive composition as long as it provides for the desired catalytic properties of the invention. As the term is used herein, an amine or amine compound is a molecule having an amino functional group, thus, a nitrogen atom having bonded thereto up to three separate atoms of hydrogen or one, two or three groupings of atoms. Examples of desirable amine components are molecules that may be selected from the group of compounds consisting of ether amine compounds, alkyl or alkenyl amine compounds, amine oxide compounds.

The alkyl or alkenyl amine compounds that may be suitable as a component of the inventive composition include those selected from the group consisting of primary amines, secondary amines and tertiary amines. More specifically, it is desirable for the alkyl or alkenyl amine compound to be selected from the group of amine compounds consisting of primary amines having from 8 to 20 carbon atoms, secondary amines having from 8 to 20 carbon atoms, and tertiary amines having from 8 to 20 carbon atoms. Preferred alkyl or alkenyl amine compounds are those which include primary amines having from 8 to 20 carbon atoms. Typically, the alkyl or alkenyl amine compound is selected from such alkyl or alkenyl amines that have a molecular weight in the range of from 100 to 320. Examples of possible suitable alkyl or alkenyl amine compounds include C8 to C20 alkyl amines, and C8 to C20 unsaturated, e.g., alkenyl, amines. Specific examples of alkyl or alkenyl amine compounds that may be suitable for use in the inventive composition include oleylamine, octyl amine, lauryl amine, stearamine, cetylamine, decylamine, and others primary amines The ether amine compounds that may be used as the amine component of the composition of the invention are those which suitably provide for the desired catalytic properties of the invention.

One physical property of the ether amine compound of the invention can be for it to have a reasonably high flash point that makes its handling easier and less problematic than with the handling of certain low flash point compounds. Therefore, it can be desirable for the flash point of the ether amine compound to be at least 80° C. (176° F.), or the flash point of the ether amine compound can be at least 85° C. (185° F.), or even, at least 90° C. (194° F.). It also may be beneficial for the ether amine compound to at least be in the liquid state at a temperature of about 5° C. (41° F.) or higher, or at 10° C. (50° F.) or higher, or at 15° C. (59° F.).

The ether amine compound also can have a molecular weight in the range of from about 165 to about 300. More typically, the molecular weight of the ether amine compound is in the range of from 185 to 280, and, most typically, the molecular weight is in the range of from 200 to 265.

Potential ether amine compounds suitable for use as a component of the inventive compostion are ether amines selected from the family of compounds having the following formula: R—O—(CH$_2$)$_n$NH$_2$, wherein R is an alkyl functional group comprising from 4 to 14 carbon atoms and n is an integer ranging from 1 to 6. Specific examples of possible suitable ether amine compounds include those selected from the group of ether amine compounds consisting of hexyloxypropyl amine, isohexyloxypropyl amine, 2-ethylhexyloxypropyl amine, octyloxypropylamine, decycloxypropyl amine, isodecyloxypropyl amine, dodecyloxypropylamine, isododecyloxypropyl amine, isotridecyloxypropyl amine, and mixtures of any two or more thereof. Two particularly useful ether amine compounds include octyloxypropyl amine and decyloxypropyl amine and mixtures thereof.

The amine oxide compounds of the invention are oxides of amines that include those selected from the family of compounds having the following formula [insert drawing of R1, R2 and R3]N$^+$O$^-$, wherein wherein R1 is either a hydrogen atom or an alkyl functional group, R2 is either a hydrogen atom or an alkyl functional group, and R3 is either a hydrogen atom or an alky functional group, wherein the total number of carbon atoms included in R1 and R2 and R3 is in the range of from 8 carbon atoms to 40 carbon atoms. Examples of amine oxides, some of which may be suitably used as an amine component of the inventive composition, are disclosed in U.S. Pat. No. 5,972,875 and U.S. Pat. No. 3,457,312, both of which patents are incorporated herein by reference.

Preferred amine oxide compounds are oxides of tertiary amines, and, among these, ether amine oxides are especially preferred. Such ether amine oxides can be selected from the family of compounds having the following formula [insert R1, R2 and R3]N—O, wherein R1 is R4-O—CH$_2$CH$_2$CH$_2$— with R4 being either a hydrogen atom or an alkyl or alkenyl group having from 1 to 4 carbon atoms, R2 is H(CH$_2$CH$_2$O)$_x$—, and R3 is H(CH$_2$CH$_2$O)$_{n-x}$. Particularly advantageous ether amine oxides are those marketed by Air Products under the brand name Tomamine, and, of these, Tomamine AO-405 and Tomamine AO-455 are especially good.

The non-amine containing polar additives of the inventive composition include the polar additive compounds that are described in U.S. patent application Publication, Pub. No. US 2010/0236988 but excluding, however, those polar additive compounds that are heterocompounds having an amino functional group or a sulfur atom. The molecular polarity or molecular dipole moment as used in this specification are as described and defined in the aforementioned U.S. patent application Publication. Also, the term heterocompound, as it is used in this specification, is as defined in U.S. Pub. No. US 2010/0236988.

The dipole moment of the non-amine containing polar additive of the inventive composition should be at least or exceed 0.45. However, it is preferred for the non-amine containing polar additive to have a characteristic dipole moment that is at least or exceeds 0.5, and, more preferred, the dipole moment of the polar additive should be at least or exceed 0.6. A typical upper limit to the dipole moment of the polar additive of the polar additive may be, for example, in the range of from 0.45 to 5. It is preferred for the dipole moment of the polar additive to be in the range of from 0.5 to 4.5, and, more preferred, the dipole moment is in the range of from 0.6 to 4.

As already noted elsewhere herein, it has been discovered that the use of a combination of an amine component and a non-amine containing polar additive with a support material that is loaded with an active metal precursor provides for a hydroprocessing catalyst having enhanced catalytic properties over those compositions that include a support material loaded with an active metal precursor and having either an amine component alone or a non-amine containing polar additive alone. To obtain the synergistic effect of combining the use of the amine component and the non-amine containing polar additive, the relative ratio of these two components incorporated into the support material that is loaded with an active metal precursor should be within the ranges as described above.

In the preparation of the inventive composition, it is a particularly important for the support material having a metal component incorporated therein to be uncalcined and non-sulfided when it is impregnated with the amine component and the non-amine containing polar additive. Cost savings in the preparation of the composition are realized by not having to calcine or sulfide the metal-incorporated or impregnated support material.

Before the incorporation of the amine component and the non-amine containing polar additive into the support material having a metal component incorporated therein, particularly when the metal component is added to the support material by impregnation using an aqueous solution of a metal salt (metal-impregnated support material), it is important for this metal-impregnated support material to be dried so as to remove at least a portion of the volatile liquid contained within the pores of the support material to provide pore volume that can be filled with the amine component and the non-amine containing polar additive. The metal-impregnated support material, thus, is dried under drying conditions that include a drying temperature that is less than a calcination temperature.

A significant feature of the invention is for the drying temperature under which the drying step is conducted to not exceed a calcination temperature. Thus, the drying temperature should not exceed 400° C., and, preferably, the drying temperature at which the metal-impregnated support material is dried does not exceed 300° C., and, most preferably, the drying temperature does not exceed 250° C. It is understood that the drying step will, in general, be conducted at lower temperatures than the aforementioned temperatures, and, typically, the drying temperature will be conducted at a temperature in the range of from 60° C. to 150° C.

The drying of the metal-impregnated support material is preferably controlled in a manner so as to provide the resulting dried metal-impregnated support material having a volatiles content that is in a particular range. The volatiles content of the dried metal-impregnated support material should be controlled so that it does not exceed 20 wt. % LOI.

The LOI, or loss on ignition, is defined as the percentage weight loss of the material after its exposure to air at a temperature of 482° C. for a period of two hours, which can be represented by the following formula: (sample weight before exposure less sample weight after exposure) multiplied by 100 and divided by (sample weight before exposure). It is preferred for the LOI of the dried metal-impregnated support material to be in the range of from 1 wt. % to 20 wt. %, and, most preferred, from 3 wt.% to 15 wt. %. The dried metal-impregnated support material is further impregnated, as described herein, with the amine component and non-amine containing polar additive.

The impregnated composition may be treated, either ex situ or in situ, with hydrogen and with a sulfur compound, and, indeed, it is one of the beneficial features of the invention that it permits the shipping and delivery of a non-sulfurized composition to a reactor in which it can be activated, in situ, by a hydrogen treatment step followed by a sulfurization step. As earlier noted, the impregnated composition can first undergo a hydrogen treatment that is then followed with treatment with a sulfur compound.

The hydrogen treatment includes exposing the impregnated composition to a gaseous atmosphere containing hydrogen at a temperature ranging upwardly to 250° C. Preferably, the impregnated composition is exposed to the hydrogen gas at a hydrogen treatment temperature in the range of from 100° C. to 225° C., and, most preferably, the hydrogen treatment temperature is in the range of from 125° C. to 200° C.

The partial pressure of the hydrogen of the gaseous atmosphere used in the hydrogen treatment step generally can be in the range of from 1 bar to 70 bar, preferably, from 1.5 bar to 55 bar, and, most preferably, from 2 bar to 35 bar. The impregnated composition is contacted with the gaseous atmosphere at the aforementioned temperature and pressure conditions for a hydrogen treatment time period in the range of from 0.1 hours to 100 hours, and, preferably, the hydrogen treatment time period is from 1 hour to 50 hours, and most preferably, from 2 hours to 30 hours.

Sulfiding of the impregnated composition after it has been treated with hydrogen can be done using any conventional method known to those skilled in the art. Thus, the hydrogen treated impregnated composition can be contacted with a sulfur-containing compound, which can be hydrogen sulfide or a compound that is decomposable into hydrogen sulfide, under the contacting conditions of the invention. Examples of such decomposable compounds include mercaptans, $CS_2$, thiophenes, dimethyl sulfide (DMS), and dimethyl disulfide (DMDS). Also, preferably, the sulfiding is accomplished by contacting the hydrogen treated composition, under suitable sulfurization treatment conditions, with a hydrocarbon feedstock that contains a concentration of a sulfur compound. The sulfur compound of the hydrocarbon feedstock can be an organic sulfur compound, particularly, one which is typically contained in petroleum distillates that are processed by hydrodesulfurization methods.

Suitable sulfurization treatment conditions are those which provide for the conversion of the active metal components of the hydrogen treated composition to their sulfided form. Typically, the sulfiding temperature at which the hydrogen treated composition is contacted with the sulfur compound is in the range of from 150° C. to 450° C., preferably, from 175° C. to 425° C., and, most preferably, from 200° C. to 400° C.

When using a hydrocarbon feedstock that is to be hydrotreated using the catalyst composition of the invention to sulfide the hydrogen treated composition, the sulfurization conditions can be the same as the process conditions under which the hydrotreating is performed. The sulfiding pressure at which the hydrogen treated composition is sulfided generally can be in the range of from 1 bar to 70 bar, preferably, from 1.5 bar to 55 bar, and, most preferably, from 2 bar to 35 bar.

As noted above, one of the benefits provided by the composition of the invention is that it can be utilized in a reactor system that is started up using a so-called delayed feed introduction procedure. In the delayed feed introduction procedure, the reactor system, which includes a reactor vessel containing the impregnated composition, first undergoes a heating step to raise the temperature of the reactor and the impregnated composition contained therein in preparation for the introduction of a sulfiding agent or heated hydrocarbon feedstock for processing. This heating step includes introducing into the reactor the hydrogen-containing gas at the aforementioned hydrogen treatment conditions. After the hydrogen treatment of the impregnated composition, it is thereafter treated with a sulfur compound in the manner as earlier described herein.

It is recognized that the impregnated composition of the invention, after its treatment with hydrogen and sulfur, is a highly effective catalyst for use in the hydrotreating of hydrocarbon feedstocks. This catalyst is particularly useful in applications involving the hydrodesulfurization (HDS) or hydrodenitrogenation (HDN), or both, of hydrocarbon feedstocks, and, especially, it has been found to be an excellent catalyst for use in the HDS and HDN of gas oil feedstocks.

The inventive composition may be used as well to make ultra-low sulfur distillate product having a sulfur concentration of less than 15 ppmw, preferably, less than 10 ppmw, and, most preferably, less than 8 ppmw. Also, as noted, the inventive composition may be used to treat heavier hydrocarbon feedstocks, such as the gas oils. In the hydrotreatment of gas oil, the nitrogen content of the treated product is typically less than 1000 ppmw, or less than 800 ppmw, and, even less than 600 ppmw. The sulfur content of the treated product is typically less than 500 ppmw, or less than 400 ppmw, and, even less than 300 ppmw.

In hydrotreating applications, the impregnated composition, preferably is used in a delayed feed introduction procedure or otherwise treated with hydrogen and sulfur, as described above. In this procedure, the impregnated composition is contacted under suitable hydrodesulfurization conditions with a hydrocarbon feedstock that typically has a concentration of sulfur. This provides for sulfiding of the impregnated composition.

One hydrocarbon feedstock that may be processed using the inventive composition is a petroleum middle distillate cut having a boiling temperature at atmospheric pressure in the range of from 140° C. to 410° C. These temperatures are approximate initial and boiling temperatures of the middle distillate. Examples of refinery streams intended to be included within the meaning of middle distillate include straight run distillate fuels boiling in the referenced boiling range, such as, kerosene, jet fuel, light diesel oil, heating oil, heavy diesel oil, and the cracked distillates, such as FCC cycle oil, coker gas oil, and hydrocracker distillates. The preferred distillate feedstock is a middle distillate boiling in the diesel boiling range of from about 140° C. to 400° C.

The gas oils may also be processed using the inventive composition. These gas oils may include atmospheric gas oil, light vacuum gas oil, and heavy vacuum gas oil. It is further contemplated that the inventive composition may have use in the treatment of residuum feedstocks, as well.

The sulfur concentration of the middle distillate feedstock can be a high concentration, for instance, being in the range upwardly to about 2 weight percent of the distillate feedstock based on the weight of elemental sulfur and the total weight of the distillate feedstock inclusive of the sulfur compounds. However, the distillate feedstock typically has a sulfur concentration in the range of from 0.01 wt. % (100 ppmw) to 1.8 wt. % (18,000). But, more typically, the sulfur concentration is in the range of from 0.1 wt. % (1000 ppmw) to 1.6 wt. % (16,000 ppmw), and, most typically, from 0.18 wt. % (1800 ppmw) to 1.1 wt. % (11,000 ppmw). It is understood that the references herein to the sulfur content of the distillate feedstock are to those compounds that are normally found in a distillate feedstock or in the hydrodesulfurized distillate product and are chemical compounds that contain a sulfur atom and which generally include organosulfur compounds.

The impregnated composition of the invention may be employed as a part of any suitable reactor system that provides for contacting it or its derivatives with the distillate feedstock under suitable hydrodesulfurization conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulfur distillate product from the reactor vessel.

The hydroprocessing process generally operates at a hydroprocessing reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydroprocessing reaction temperature is generally in the range of from 200° C. (392° F.) to 420° C. (788° F.), preferably, from 260° C. (500° F.) to 400° C. (752° F.), and, most preferably, from 320° C. (608° F.) to 380° C. (716° F.).

It is recognized that one of the unexpected features from the use of the inventive composition is that it exhibits higher catalytic activity than certain other alternative catalyst compositions, and, thus, it will, in general, provide for comparatively lower required process temperatures for a given amount of desulfurization or denitrogenation, or both.

The flow rate at which the hydrocarbon feedstock is charged to the reaction zone of the inventive process is generally such as to provide a liquid hourly space velocity (LHSV) in the range of from 0.01 $hr^{-1}$ to 10 $hr^{-1}$. The term "liquid hourly space velocity", as used herein, means the numerical ratio of the rate at which the hydrocarbon feedstock is charged to the reaction zone of the inventive process in volume per hour divided by the volume of catalyst contained in the reaction zone to which the hydrocarbon feedstock is charged. The preferred LHSV is in the range of from 0.05 $hr^{-1}$ to 5 $hr^{-1}$, more preferably, from 0.1 $hr^{-1}$ to 3 $hr^{-1}$, and, most preferably, from 0.2 $hr^{-1}$ to 2 $hr^{-1}$.

It is preferred to charge hydrogen along with the hydrocarbon feedstock to the reaction zone of the inventive process. In this instance, the hydrogen is sometimes referred to as hydrogen treat gas. The hydrogen treat gas rate is the amount of hydrogen relative to the amount of hydrocarbon feedstock charged to the reaction zone and generally is in the range upwardly to 1781 $m^3/m^3$ (10,000 SCF/bbl). It is preferred for the treat gas rate to be in the range of from 89 $m^3/m^3$ (500 SCF/bbl) to 1781 $m^3/m^3$ (10,000 SCF/bbl), more preferably, from 178 $m^3/m^3$ (1,000 SCF/bbl) to 1602 $m^3/m^3$ (9,000 SCF/bbl), and, most preferably, from 356 $m^3/m^3$ (2,000 SCF/bbl) to 1425 $m^3/m^3$ (8,000 SCF/bbl).

The hydrotreated product yielded from the process of the invention has low or reduced sulfur and nitrogen concentrations relative to the hydrocarbon feedstock.

The following examples are presented to further illustrate certain aspects of the invention, but they are not to be construed as limiting the scope of the invention.

EXAMPLE I

This Example I describes the preparation of a comparative composition that contains a prior art additive and of the inventive compositions that contain the additives, i.e., an amine component and a non-amine containing polar additive, of the invention.

A commercially available alumina carrier was used in the preparation of the catalyst compositions of this Example I. The following Table 1 presents the typical physical properties of the alumina carrier that was used in the preparations.

TABLE 1

| Typical Alumina Carrier Properties | |
|---|---|
| Property | Value |
| Compacted Bulk Density(g/cc) | 0.49 |
| Water Pore Volume (cc/g) | 0.88 |
| BET Surface Area (m2/g) | 300 |
| Median Pore Diameter by Volume (angstroms) | 91 |

The metal components of the catalyst were incorporated into the carrier by the incipient wetness impregnation technique. The impregnation solution included 75.6 weight parts water, 11.8 weight parts phosphoric acid ($H_3PO_4$), 12.8 weight parts nickel carbonate ($NiCO_3$), and 35.3 weight parts Climax molybdenum trioxide (62.5% Mo). 135.5 weight parts of the impregnation solution was incorporated into 100 weight parts of alumina carrier to provide a metal-incorporated support material.

The impregnated carrier or metal-incorporated support material was then dried at 125° C. (257° F.) for a period of several hours to give a dried intermediate having an LOI of 7.9 wt% and a water pore volume of 0.331 cc/g.

Aliquot portions of the dried intermediate were then each impregnated with a selection of one of the following four additives or additive mixtures to fill 92% of the pore volume of the dried intermediate: (1) 100% Arosurf MG-98 ether amines, which is a mixture of the two ether amines of 3-(octyloxy) propylamine and 3-(decyloxy) propylamine, wherein Arosurf MG-98 ether amines is a product marketed by Evonik Industries; (2) a mixture of 50 vol % DMF and 50 vol % NFM; (3) a mixture of 40 vol % n-formylmorpholine (NFM) and 60 vol % Arosurf MG-98 ether amines; (4) 100% dimethylformamide (DMF); (5) a mixture of 50 vol % Adogen-160 amines and 50 vol % DMF, wherein Adogen-160 amines is a mixture of amines having an average number of carbon atoms of 12 and is a product marketed by Evonik Industries; (6) a mixture of 50 vol % Tomamine AO-405 alkoxylated ether amine oxide and 50 vol % DMF, wherein Tomamine AO-405 alkoxylated ether amine oxide product is marketed by Air Products; (7) a mixture of 50 vol % Tomamine AO-455 alkoxylated ether amine oxide and 50 vol % DMF, wherein Tomamine AO-455 alkoxylated ether amine oxide product is marketed by Air Products; (8) 100% oleylamine; and (9) 50 vol % oleylamine and 50 vol % DMF. The DMF and NFM are non-amine containing polar additives.

Certain of the physical properties of the individual organic additives are presented in the following Table 2.

TABLE 2

| | Properties of Various Organics | | | | | | | |
|---|---|---|---|---|---|---|---|---|
| | DMF | NFM | Ether amine 3-(Octyloxy) propylamine | Ether amine 3-(Decyloxy) propylamine | Andogen-160 | Tomamine AO-405 | Tomamine AO-455 | Oleyamine |
| Flash Point (° F.) | 136 | 235 | 210 | 242 | >200 | 212 | >212 | 338 |
| Molecular Weight (g/mole) | 79.09 | 115.13 | 187.32 | 215.38 | See note below | See note below | See note below | 267.47 |

TABLE 2-continued

Properties of Various Organics

|  | DMF | NFM | Ether amine 3-(Octyloxy) propylamine | Ether amine 3-(Decyloxy) propylamine | Andogen-160 | Tomamine AO-405 | Tomamine AO-455 | Oleyamine |
|---|---|---|---|---|---|---|---|---|
| Boiling Point (° F.) | 307.4 | 458.6 | 514.4 | 577.6 | 498 | 210 | 210 | 349 |
| Melting Point (° F.) | −77.8 | 73.4 | N/A | N/A | N/A | 32 | 32 | 70 |
| Formula | $C_3H_7NO$ | $C_5H_9NO_2$ | $C_{11}H_{25}NO$ | $C_{13}H_{29}NO$ | See note below | See note below | See note below | $C_{18}H_{37}N_1$ |
| Density (g/cc) | 0.944 | 1.145 | 0.85 | 0.85 | 0.83 | 1.01 | 1.04 | 0.813 |

Adogen-160 is a mixture of alkylamines with a peak at C12.
Tomamine AO-405 is listed as Poly[oxy(methyl-2,1-ethanediyl)],a,a'-[(oxidoimino)bis(methyl-2,1-ethanediyl)]bis[w-hydroxy-,N-[3-(C9-11-isoalkyloxy)propyl] derivs., C10-rich
Tomamine AO-455 is listed as Oxirane,methyl-, polymer with oxirane, ether with 2,2-(oxidoimino)bis(ethanol) (2:1), N-(3-(C9-11-isoalkyloxy)propyl) derivs., C10-rich

EXAMPLE II

This Example II describes the general procedure used to test the catalytic performance of the additive impregnated compositions described in Example I, and it presents the performance results from their use in the hydrodesulfurization and hydrodenitrogenation of a typical vacuum gas oil.

Each of the additive impregnated compositions of Example I was tested using reactors of a high throughput catalyst testing unit under the conditions presented in the following Table 3.

TABLE 3

Reactor Test Conditions and Targets

| Hydrogen/Oil Ratio | 4060 scf/bbl |
| Pressure | 1350 psig |
| LHSV | 1 $hr^{-1}$ |
| Temperature | 698° F. |
| Target Nitrogen | 500 ppm |
| HDN Reaction Order | 0.86 |
| HDN Apparent Activation Energy | 26 kcal/mole |
| Target S | 200 ppm |
| HDS Reaction Order | 1.3 |
| HDS Apparent Activation Energy | 33 kcal/mole |

The feedstock used in the testing was a typical vacuum gas oil having the physical properties as presented in the following Table 4.

TABLE 4

Test Feedstock Properties

| Hydrogen (wt %) | 11.65 |
| Carbon (wt %) | 85.60 |
| Nitrogen (wt %) | 0.44 |
| Sulfur (wt %) | 2.05 |
| Nickel (ppm) | 1 |
| Vanadium (ppm) | 2.5 |
| Basic Nitrogen (ppm) | 1447 |
| API Gravity | 19.29 |
| UV Aromatics | |
| 1 | 4.9 |
| 2 | 4.2 |
| 3 | 5.0 |
| 4+ | 3.8 |
| Total | 18.0 |
| MCR (wt %) | 0.2 |
| HTSD 50% (° F.) | 774 |
| HTSD 95% (° F.) | 980 |

The results of the activity testing of the additive impregnated compositions are presented in the following Table 5.

The catalyst activity, in this case, is defined as the temperature required to achieve a target concentration of nitrogen (500 ppm) or sulfur (200 ppm) in the treated product using a designated catalyst relative to the temperature required to achieve the same concentration of nitrogen or sulfur in the treated product using a reference catalyst. With this definition, larger negative activity numbers indicate higher activity.

TABLE 5

Catalyst Performance Results

| No. | Description | Relative HDN Activity (° F.) | Relative HDS Activity (° F.) |
|---|---|---|---|
| 1 | 100% Arosurf MG-98 | −10 | −7 |
| 2 | 50/50 DMF/NFM | −14 | −10 |
| 3 | 40/60 NFM/Arosurf MG-98 | −13 | −10 |
| 4 | 100% DMF | −5 | −2 |
| 5 | 50/50 Adogen-160/DMF | −14 | −11 |
| 6 | 50/50 Tomah AO-405/DMF | −11 | −8 |
| 7 | 50/50 Tomah AO-455/DMF | −17 | −10 |
| 8 | 100% oleylamine | −3 | 0 |
| 9 | 50/50 oleylamine/DMF | −10 | −6 |

The performance data presented in Table 5 show that the composition which contains only ether amine as a component (#1) and the composition which contains only DMF as a component (#4) both exhibit significantly lower hydrodesulfurization (HDS) and hydrodenitrogenation (HDN) activities than the compositions that comprise a combination of the ether amine with either DMF (#2) or NFM (#3). In both these cases, the HDN and HDS activities are significantly improved over the activities exhibited by the compositions that contain either the ether amine alone (#1) or the DMF alone (#4). Likewise, the composition which contains only an primary amine as a component (#8) exhibits significantly lower HDS and HDN activities than the composition that comprises a combination of the primary amine and DMF (#9). Also, the compositions which contain a combination of both an amine oxide, or ether amine oxide, and DMF (#6 & #7) exhibit significantly better HDN and HDS activity than the composition that contains DMF alone (#4). The compositions which contain a combination of both an amine compound and DMF (#5 & #9) also exhibit significantly better HDN and HDS activity than the composition that contains DMF alone. These data suggest a synergistic effect resulting from using a non-amine containing polar additive in combination with either an ether amine compound, or an alkyl or alkenyl amine compound, or an amine oxide compound.

That which is claimed is:

1. A composition, consisting essentially of: a support material that is loaded with an active metal precursor, an amine component, and a non-amine containing polar additive; wherein the weight ratio of said non-amine containing polar additive to said amine component is in the range of upwardly to 10:1; wherein said amine component is selected from the group of compounds consisting of ether amine compounds, alkyl amine compounds, and amine oxide compounds; and wherein said amine compound has a molecular weight greater than 160 and a flash point of at least 80° C.

2. A composition as recited in claim 1, wherein said amine component is an ether amine compound.

3. A composition as recited in claim 2, wherein said ether amine compounds include those selected from the family of compounds having the following formula: R—O—$(CH_2)_n$NH$_2$, wherein R is an alkyl functional group comprising from 4 to 14 carbon atoms and n is an integer of ranging from 1 to 6.

4. A composition as recited in claim 1, wherein said amine oxide compounds include those selected from the family of compounds having the following formula: [insert drawing of R1, R2 and R3] $N^+O^-$, wherein R1 is either a hydrogen atom or an alkyl functional group, R2 is either a hydrogen atom or an alkyl functional group, and R3 is either a hydrogen atom or an alky functional group, wherein the total number of carbon atoms included in R1 and R2 and R3 is in the range of from 8 carbon atoms to 40 carbon atoms.

5. A composition as recited in claim 1, wherein said alkyl amine compounds include those selected from the group of amine compounds consisting of primary amines having from 8 to 20 carbon atoms, secondary amines having from 8 to 20 carbon atoms, and tertiary amines having from 8 to 20 carbon atoms.

6. A composition as recited in claim 1, wherein said non-amine containing polar additive is selected from those compounds having a dipole moment of at least 0.45 and which are an heterocompound but excluding heterocompounds that include an amino functional group or a sulfur atom.

7. A composition as recited in claim 1, wherein said active metal precursor is a metal compound that includes a Group 9 and Group 10 metal component selected from the group consisting of cobalt and nickel, and wherein said Group 9 and Group 10 metal component is present in said composition in an amount in the range of from 5 wt. % to 50 wt. %.

8. A composition as recited in claim 7, wherein said support material that is loaded with said active metal precursor, said amine component, and said non-amine containing polar additive is treated with hydrogen.

9. A composition as recited in claim 8, wherein said support material that is loaded with said active metal precursor, said amine component, and said non-amine containing polar additive treated with hydrogen is treated with a sulfur compound.

10. A composition as recited in claim 1, wherein said support material is loaded with an active metal precursor, an amine component, and a non-amine container polar additive in the substantial absence of a hydrocarbon oil.

11. A composition as recited in claim 1, wherein said amine component is a mixture of two ether amines of 3-(octyloxy)propylamine and 3-(decyloxy)propylamine.

12. A composition as recited in claim 5, wherein said alkyl amine is oleylamine.

13. A composition as recited in claim 2, wherein said non-amine containing polar additive is a n-formylmorpholine (NFM).

14. A composition as recited in claim 11, wherein said non-amine containing polar additive is n-formylmorpholine (NFM).

* * * * *